April 21, 1959      F. P. SHIPLET      2,882,889
PORTABLE FOLIAGE AND STALK BURNER
Filed Jan. 16, 1956      2 Sheets-Sheet 1
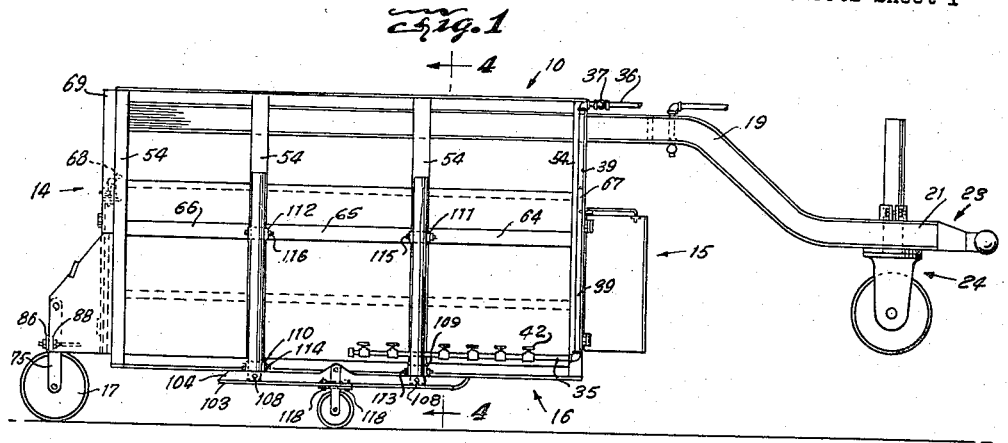
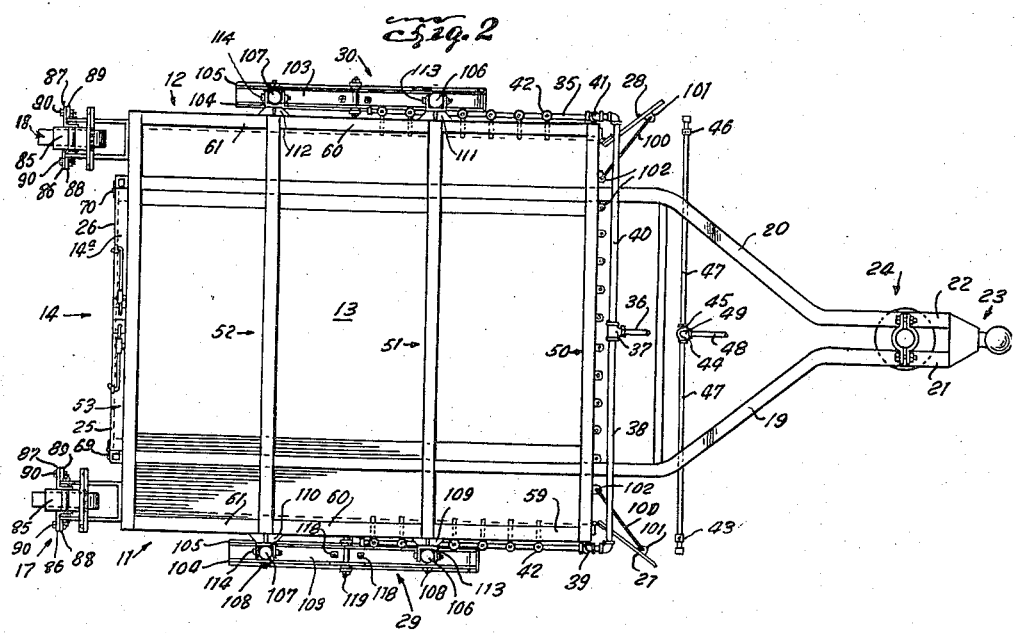
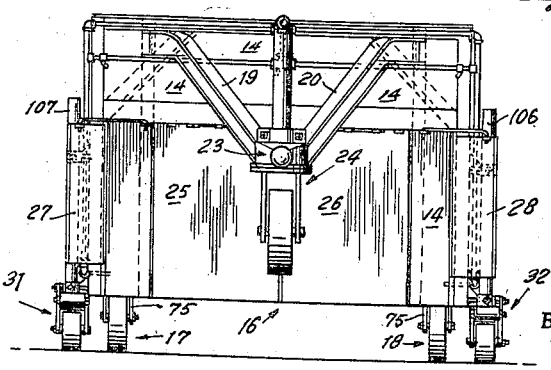
INVENTOR
Francis P. Shiplet
BY
ATTORNEY

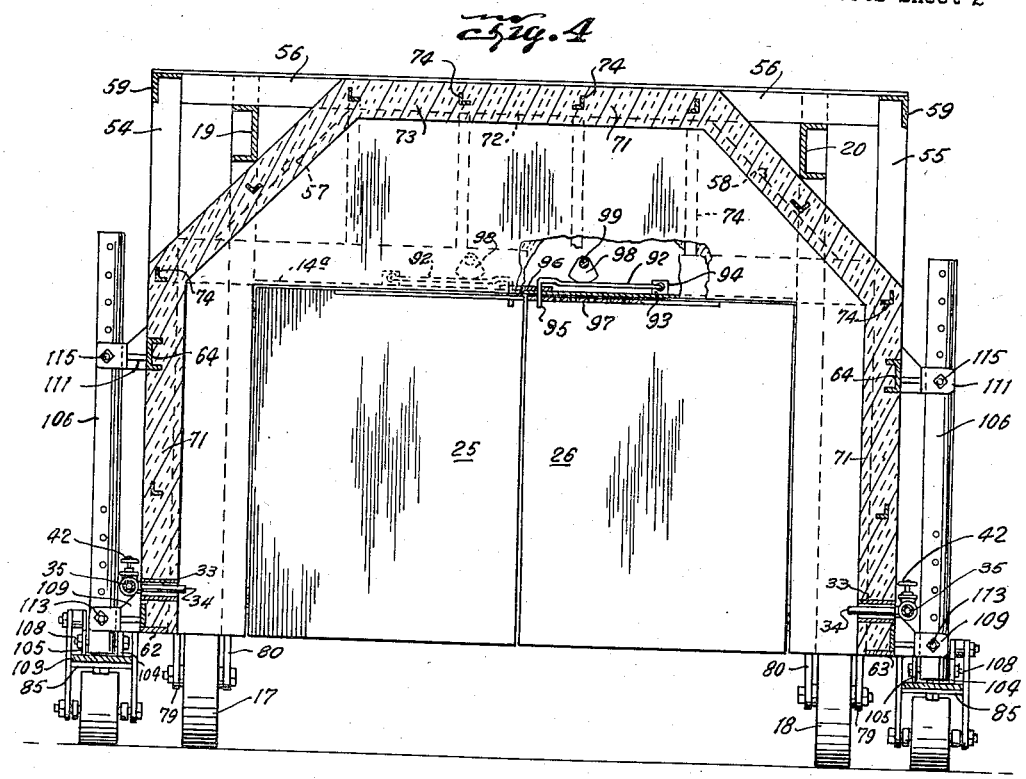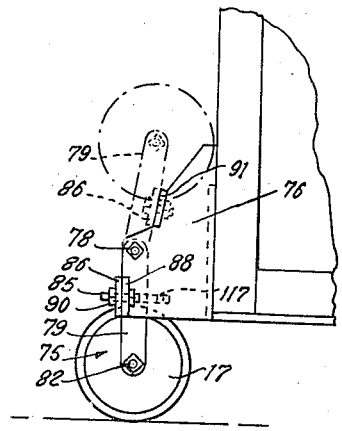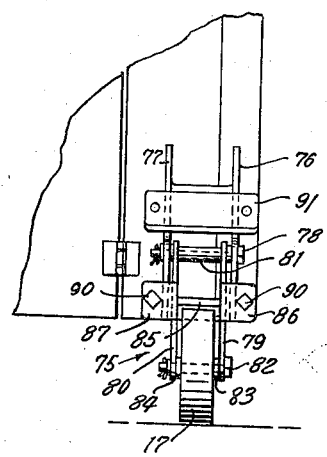

2,882,889

PORTABLE FOLIAGE AND STALK BURNER

Francis P. Shiplet, Waxahachie, Tex., assignor of one-fourth to Lem Wray, Waxahachie, Tex.

Application January 16, 1956, Serial No. 559,287

1 Claim. (Cl. 126—271.2)

This invention relates to improvements in portable insect exterminators.

It is customary to burn farm crop plants for the principal purpose of destroying crop damaging insects and bugs. The plants are cut and usually left where they fall or they are raked into piles and burned after the foliage has dried sufficiently to support combustion. Experience has proven this procedure to be inadequate especially in this case of cotton plants. Boll weevils and other insects soon abandon withering foliage and migrate to other fields or bury themselves in the ground, depending upon the time of year and weather. In any case they are not destroyed.

To be certain of destroying them, they and their eggs must be killed while on the standing living plants. However, so far as is known, there is now no practical and economical means by which this can be accomplished. It is the principal object of this invention to provide such means.

Broadly, the invention consists of a portable device in the form of a hood equipped with burners, adapted to be coupled behind any suitable towing vehicle and moved over plants in the field, subjecting them as well as the ground thereunder to intense heat. The hood is supported on wheels or skids or both according to the soil conditions.

For a cotton field, for example, the hood is made large enough to embrace at least two rows of plants, but of course a one row device can also be built. For greater economy at least two of these devices can be towed side by side and thus embrace four rows at one time.

Spray nozzles are provided beyond the hood to soak the foliage thoroughly. The nozzles are set at an angle to insure penetration between and around the leaves, stems and stalks.

This spraying also promotes a more uniform distribution of the flame and heat after the plants enter the hood and become ignited. When the foliage is especially heavy due usually to a wet season, a second operation may be necessary to reduce substantially all of the plant to ash.

In the drawings, Fig. 1 is an elevational view of the right side of the invention.

Fig. 2 is the top view.

Fig. 3 is an elevational view of the front.

Fig. 4 is a sectional view taken on the line 4—4 in Fig. 1.

Fig. 5 is an elevational side view of the right rear wheel and its mounting, showing how the rear wheels can be swung upwardly to clear the ground and there secured.

Fig. 6 is a front elevational view of the right rear wheel and its mounting.

Continuing with a more detailed description of the invention, reference numeral 10, Fig. 1 of the drawings, designates in general a housing or hood having two closed sides 11, 12, a closed top 13, a back 14, a partly open front 15 and an open bottom 16. The hood is supported at the rear by the wheels 17 and 18, and at the front by the beams 19 and 20, which extend forward beyond the hood-front, and which are arranged at their forward ends 21 and 22, for mounting the ball-piece 23 of a conventional ball and socket coupling. Just behind said ball-piece mounting, a vertically adjustable wheel 24 is also mounted upon said beams, for supporting the hood when not coupled to a towing vehicle. The back of the hood has one or more vent openings provided with adjustable dampers 25 and 26, while on the front, hinged guide-panels 27 and 28 are mounted, one at each side of said front-opening to guide the plant foliage into the hood.

Adjustable skids 29 and 30 carrying demountable wheels 31 and 32 are arranged on the hood, one on each side. One or more sleeves 33, Fig. 4, are provided through the side-walls 11 and 12, near the bottom, in which one or more burners 34 are mounted. Fuel supply headers 35, one on each side of said hood connect to said burners. A fuel supply line 36 connects to the pipe-T 37 which has branch pipes 38 and 39 connecting to said header on side-wall 11, and branch pipes 40 and 41 connecting to said header mounted on side wall 12. A valve 42 is provided at each burner for fuel regulation.

Spray nozzles 43, 44, 45, 46, mounted on header 47, are located some distance forward from the front opening of the hood, said header being supported on beams 19, 20, already mentioned. These nozzles are set at an angle to promote thorough spraying of the foliage before it enters the hood. A fuel supply line 48 connects to T-fitting 49 placed at any convenient point in said header 47.

The hood is made of four principal inverted rectangular U-shaped frames, 50, 51, 52, 53, Figs. 1 and 2, each of said frames having legs 54, 55, Fig. 4, joined at their tops by cross-member 56, and stiffened by the knee-braces 57, 58. These frames are spaced at the top by pairs of angles 59, 60, 61, and have their legs mounted on the pair of bottom angles 62 and 63, Fig. 4, with the same spacing. The frame legs are also spaced at substantially their centers by the pairs of cross-members 64, 65, 66.

The frame 50 has cross-member 67 extending between its legs some distance below the top of said frame and parallel to it. This cross-member forms the upper edge of the front opening 15. The back frame 53, has a similar cross-member 68 extending between its legs and also the upright members 69 and 70, which, with said cross-member forms the rear opening or vent in the back wall.

The hood walls and top are composed for fireproof insulating material 71, or are made with a vitrious lining 72 backed by suitable insulation 73. In either case, the wall forming material is supported by the steel framing just described as well as by the additional members 74, Fig. 4, provided in and between said principal frames by any well known means such as wire loops, hooks or bolts engaging said framing and embedded in said material.

To provide rear wheels 17, 18, wheel-carrying forks 75, Figs. 4, 5, 6, are pivotly supported between plates 76 and 77, on bearing-bolts 78, said plates being mounted on the back of the hood and extending rearwardly therefrom; said forks each consisting of two legs 79 and 80, connected at their upper ends to sleeve-spacer 81, said legs, sleeve-spacer and supporting plates arranged to receive said bearing-bolt; said forks also have bearing-bolts 82 at their lower ends, with washers 83 and 84 to carry said wheels.

A spacer-plate 85 is mounted between each pair of fork legs, just above the wheels. These plates have bolt-holes suitably located for mounting the wheels on the skids, as will be explained later on.

Ears 86 and 87 are mounted on said fork legs, and corresponding ears 88 and 89 are mounted on said supporting plates, said ears being arranged to receive bolts 90 for securing said wheels in downward position. The bar 91, mounted across said supporting plates has bolt-holes likewise spaced to match bolt-holes in ears 86 and 87, to secure said wheels in their upward position.

The adjustable dampers 25 and 26 in the rear vent are held in closed position, as shown, by the hooks 92, each of which has the ring 93 formed on one end engaging an opening in the ear 94, each of said hooks being bent downward at the other end to form pin 95, said pin engaging an opening in ear 96, also supported on the hood, and an opening in bar 97, mounted along the top edge of each of the said dampers. The pieces 98, are pivotly mounted by bolts 99 on the hood, one adjacent each of said hooks, to hold the pin ends of said hooks in the position just described. A series of openings suitably spaced, are provided in said bars into which said hook-pins can be placed for the purpose of varying the position of the dampers.

The hinged guide panels 27 and 28, each have a hook-bar 100 pivotly secured at one end to ears 101 mounted on said panels, the other end in each instance engaging the opening in one of a series of ears 102 mounted across and immediately above said front opening.

The skids 29 and 30 each consist of the skid-plate 103 on which two upright flanges 104 and 105 are mounted. These flanges extend substantially the length of the skid plates. Two posts, 106 and 107, are pivotly mounted on each skid between said flanges by bolts 108 which pass through said flanges and said posts. On each side of the hood four brackets 109, 110, 111, 112 are mounted. These brackets are arranged to receive said skid-posts for mounting one of said skids on each side of said hood to support same. Bolts 113, 114, 115, 116 pass through holes provided in said brackets and posts to secure same at the height desired. Additional bolt holes are provided in the posts so that height of the hood off the ground can be varied.

The wheel carrying forks which are mounted on the back of the hood can be transferred for mounting on the skids by removal of bolts 78 and 90. The spacer plates 85 have bolt-holes 117 by which said forks can be secured to the underside of the skids by bolts 118, and the heel of the forks secured by bolts 119 passing through the skid-flanges and the fork-heels. The wheels shown on the skids are mounted and secured to the skids in like fashion. This concludes the description of the invention.

What is claimed is:

In apparatus for burning standing farm crop plants in the field, while simultaneously subjecting the ground thereunder to intense heat, to thereby destroy crop damaging insects and bugs, the combination of a vehicle capable of being towed and a heat insulated hood carried by the vehicle, the hood being positioned above the ground, in spaced relation thereto, and having a top, a pair of side walls and a rear wall, the front end of the hood being substantially open and the rear wall having one or more vent openings therein, dampers providing closures for the respective vent openings, the dampers each having one of its side edges connected by hinges to the rear wall and capable of being adjustably positioned at any desired angle with respect thereto, a pair of guides each comprising a forward extension of one of the side walls, the guides each having one of its side edges connected by hinges to the adjacent side wall and capable of being adjustably positioned at any desired angle with respect thereto, one or more burners each positioned in an opening provided therefor in one of the side walls and capable of directing a flame inwardly with respect to the hood, and spray means carried by the vehicle and positioned forwardly with respect to the hood, the spray means being capable of discharging one or more streams of liquid fuel in the path of the hood.

References Cited in the file of this patent

UNITED STATES PATENTS

| | | |
|---|---|---|
| 170,198 | Smith | Nov. 23, 1875 |
| 610,612 | Setter | Sept. 13, 1898 |
| 625,711 | Stevens | May 23, 1899 |
| 628,421 | Tice | July 4, 1899 |
| 749,292 | Huck | Jan. 12, 1904 |
| 759,531 | King | May 10, 1904 |
| 768,923 | Wiedersheim | Aug. 30, 1904 |
| 899,404 | Iten | Sept. 22, 1908 |
| 1,112,241 | Ward | Sept. 29, 1914 |
| 1,410,659 | Corson | Mar. 28, 1922 |
| 1,509,340 | Corson | Sept. 23, 1924 |
| 2,076,497 | Ellis | Apr. 6, 1937 |
| 2,165,465 | Ehrhardt et al. | July 11, 1939 |
| 2,190,175 | Roche | Feb. 3, 1940 |
| 2,312,785 | Welty | Mar. 2, 1943 |
| 2,433,173 | Tucker | Dec. 23, 1947 |
| 2,542,498 | Forbes | Feb. 20, 1951 |
| 2,548,832 | Tydon | Apr. 10, 1951 |
| 2,558,160 | Sowell | June 26, 1951 |
| 2,632,991 | Schwartz | Mar. 31, 1953 |
| 2,641,423 | Harriman et al. | June 9, 1953 |
| 2,682,728 | Nisbet | July 6, 1954 |

FOREIGN PATENTS

| | | |
|---|---|---|
| 3840/26 | Australia | Sept. 15, 1926 |